US007166342B2

(12) United States Patent
Hayakawa et al.

(10) Patent No.: US 7,166,342 B2
(45) Date of Patent: Jan. 23, 2007

(54) THERMOPLASTIC RESIN FILM AND PROCESS FOR PRODUCING THE SAME

(75) Inventors: Satoshi Hayakawa, Inuyama (JP); Norimi Tabota, Inuyama (JP); Hiroshi Nagano, Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/500,114

(22) PCT Filed: Dec. 26, 2002

(86) PCT No.: PCT/JP02/13577

§ 371 (c)(1),
(2), (4) Date: Jun. 25, 2004

(87) PCT Pub. No.: WO03/055937

PCT Pub. Date: Jul. 10, 2003

(65) Prior Publication Data

US 2005/0095379 A1     May 5, 2005

(30) Foreign Application Priority Data

Dec. 27, 2001 (JP) ............................. 2001-397774
Apr. 5, 2002 (JP) ............................. 2002-104210
May 17, 2002 (JP) ............................. 2002-143484
Jun. 18, 2002 (JP) ............................. 2002-177565

(51) Int. Cl.
B32B 27/16 (2006.01)
B32B 27/28 (2006.01)
B32B 27/36 (2006.01)
B05D 3/04 (2006.01)
B05D 3/14 (2006.01)

(52) U.S. Cl. .................... 428/35.1; 428/34.9; 428/141; 428/343; 428/346; 428/347; 428/349; 428/480; 428/910; 528/272; 528/308; 526/346; 427/532; 427/533; 427/535; 427/536; 427/539

(58) Field of Classification Search .................... None
See application file for complete search history.

(56) References Cited

U.S. PATENT DOCUMENTS

| 3,639,134 A | | 2/1972 | Stegmeier et al. | |
| 4,563,316 A | * | 1/1986 | Isaka et al. | 264/448 |
| 4,717,516 A | * | 1/1988 | Isaka et al. | 264/448 |
| H688 H | | 10/1989 | Sobataka et al. | |
| 4,888,223 A | * | 12/1989 | Sugimoto et al. | 428/34.9 |
| 5,169,714 A | * | 12/1992 | Kondo et al. | 428/331 |
| 5,302,402 A | * | 4/1994 | Dudenhoeffer et al. | 426/129 |
| 5,466,424 A | * | 11/1995 | Kusano et al. | 422/186.05 |
| 5,466,498 A | * | 11/1995 | Forloni et al. | 428/36.7 |
| 6,055,505 A | * | 4/2000 | Elston | 705/1 |
| 6,294,264 B1 | * | 9/2001 | Piper et al. | 428/475.8 |
| 2002/0012756 A1 | * | 1/2002 | Kuckertz et al. | 427/569 |
| 2002/0150780 A1 | * | 10/2002 | Ito et al. | 428/480 |

FOREIGN PATENT DOCUMENTS

| EP | 0 127 149 | | 5/1984 |
| EP | 0668144 A2 | | 8/1995 |
| EP | 0826482 A2 | | 3/1998 |
| JP | 60-203653 | | 10/1985 |
| JP | 60-240434 | | 11/1985 |
| JP | 4-8736 | | 1/1992 |
| JP | 2000-195765 | | 7/2000 |
| JP | 2001-58377 | | 3/2001 |
| JP | 2001-96616 | | 4/2001 |
| JP | 2001-096616 A | | 4/2001 |
| JP | 2001-233971 | * | 8/2001 |
| JP | 2001-295051 | | 10/2001 |
| WO | 94/04601 | | 3/1994 |
| WO | WO-01/12437 A1 | | 2/2001 |

OTHER PUBLICATIONS

English translation of International Preliminary Examination Report dated Nov. 5, 2003, directed to PCT/JP02/13577.
Supplementary European Search Report dated Nov. 10, 2005, directed to corresponding EP Application No. 02791999.2.

\* cited by examiner

*Primary Examiner*—Vivian Chen
(74) *Attorney, Agent, or Firm*—Morrison & Foerster LLP

(57) ABSTRACT

A heat-shrinkable resin film which has heat shrinkage in the maximum shrinkage direction of 20% or higher when a 10 cm×10 cm square sample cut out thereof is immersed in hot water at 85° C. for 10 seconds, pulled out, subsequently immersed in water at 25° C. for 10 seconds, and then pulled out, characterized in that a content of nitrogen atoms in a surface of the film is 0.1% to 3.0% and the surface of the film has wet tension of 36 mN/m or higher; and a film roll obtained by winding up the heat-shrinkable resin film characterized in that when the rolled film is sampled at a first sampling part located up to 2 m apart from the end of the rolled film and at other sampling parts located after the first sampling part at intervals of about 100 m and an average content of nitrogen atoms of each sample is calculated, then the content of nitrogen atoms of each sample is within the ±0.8% range based on the above average content of nitrogen atoms.

10 Claims, No Drawings

THERMOPLASTIC RESIN FILM AND PROCESS FOR PRODUCING THE SAME

TECHNICAL FIELD

The present invention relates to a heat-shrinkable film which is excellent in ink adhesion at the time of printing, excellent in removable properties for alkali-removable type ink which is removable with an aqueous alkaline solution, and excellent in opening properties at the time of changing the film into label forms after cutting the film into label pieces; a heat shrinkable film roll, wherein occurrence of inferior ink adhesion in post-processing caused by variability in surface properties of the roll, inferior removable properties with an aqueous alkaline solution, and inferior opening properties after cutting the film into label pieces is significantly reduced; and a process for producing thereof.

BACKGROUND ART

Heretofore, heat-shrinkable resin films have been widely used in heat shrinkable applications such as shrink packaging, and shrink labels. In particular, oriented films of polyvinyl chloride resin, polystyrene resin, polyester resin, and the like have been used for labels, cap seals, or integrated packaging for a variety of containers such as polyethylene terephthalate (PET) containers, polyethylene containers, and glass containers.

After producing such a heat-shrinkable film, it is subjected to a printing step of various types of patterns. After printing, if necessary, the film is slit into pieces in the desired size depending on the size of a label to be used for a particular end product. Then, both right and left ends of the film are superposed on each other and bonded by means of solvent welding or the like so that the film is formed into a tube. The tube is cut into label pieces, bag pieces, or the like. Each label or bag piece is opened and put on a container and then transported on a belt conveyor or the like through a steam-blowing type heat-shrinking tunnel (steam tunnel) or a hot air blowing type heat-shrinking tunnel (hot air tunnel) to tightly fit the label or bag to the container by heat shrinkage.

In the above process, if the ink has inferior ink adhesion to the film in the printing step, dropping off or peeling off of the ink occurs to deteriorate the commercial value of a product. In particular, in recent years, alkali-removable type ink which is removable in an aqueous alkaline solution, aqueous type ink with reducing or without using an environmentally-harmful organic solvent, etc. have been developed for the purpose of recycling PET bottle labels and the like. Sometimes, however, properties of such types of ink, for example, ink adhesion to a film and the like are lowered in comparison with those of conventional type ink due to achievement of the given desired characteristics. Then, there has been a demand for a heat-shrinkable film which is excellent in adhesion for various types of ink, can exhibits excellent removable properties in an aqueous alkaline solution, and is excellent in opening properties after cut the film into label pieces as described above.

For improving ink adhesion for the above-described various types of ink, for example, it is considered to subject the surface of a film to surface treatment such as normal corona treatment under an air atmosphere so as to increase wet tension of the surface of the film. However, when wet surface tension of a film is increased by such surface treatment, the film causes a problem of fusion or blocking at a cut portion at the time of cutting the film into label pieces and therefore causes opening failure in a label fitting step. This further causes such a problem that, when such a film is shaped into a tube by solvent welding with tetrahydrofuran and 1,3-dioxolane, the solvent resistance of the film is lowered and the solvent-welded portion loses planarity to change its shape into a so-called sea weed-like shape, or the solvent-welded portion of the tube causes blocking together with another portion of the film.

DISCLOSURE OF THE INVENTION

The objects of the present invention are to provide a heat-shrinkable film which is excellent in ink adhesion for various types of ink as described above, excellent in removable properties under alkaline conditions for alkali-removable type ink, and excellent in opening properties of labels after cutting the film into label pieces; a heat shrinkable film roll which has excellent ink adhesion for various types of ink, is excellent in removable properties under alkaline conditions for alkali-removable type ink, and excellent in opening properties of labels after cutting the film into label pieces, throughout its entire length; and a process for producing thereof.

The heat-shrinkable resin film of the present invention is characterized in that it has heat shrinkage in the maximum shrinkage direction of 20% or higher when a 10 cm×10 cm square sample cut out therefrom is immersed in hot water at 85° C. for 10 seconds, pulled out, subsequently immersed in water at 25° C. for 10 seconds, and then pulled out, and that at least one surface of the film contains nitrogen atoms, the content of nitrogen atoms in the surface of the film is 0.1% to 3.0%, and the surface of the film has wet tension of 36 mN/m or higher.

When the film having the above properties is used as a heat-shrinkable film for labels of a container in a wide temperature range from low to high temperatures, the film has excellent shrink-finishing properties, which makes it possible to obtain fine shrink-finish appearance with less shrinkage spots, wrinkling and distortion. Further, beautiful gloss and clarity can be obtained.

The thermoplastic resin film having the above properties is excellent in printability such as printing workability and adhesion for various types of ink, excellent in removable properties under alkaline conditions for alkali-removable type ink, and, regarding opening properties after cutting the film into label pieces, excellent in processability in a label fitting step without occurrence of fusion or blocking at a cut portion.

Further, in the present invention, the heat-shrinkable film having the surface properties containing nitrogen atoms as described above has an excellent aptitude, in particular, for label recycling in view of removable properties under alkaline conditions as well as adhesion for alkali-removable type ink which is removable in an alkaline solution.

In a preferred embodiment of a process for producing the thermoplastic resin film having the above surface properties of the present invention, at least one surface of the thermoplastic resin film is subjected to corona or plasma treatment under a nitrogen atmosphere.

The heat-shrinkable film roll of the present invention is a film roll obtained by winding the heat-shrinkable film. The heat-shrinkable film roll has heat shrinkage in the maximum shrinkage direction of 20% or higher, when a 10 cm×10 cm square sample cut out therefrom is immersed in hot water at 85° C. for 10 seconds, pulled out, subsequently immersed in water at 25° C. for 10 seconds, and then pulled out, whose at least one surface has a content of nitrogen atoms of 0.1% to 4.0%. When the rolled film is sampled at a first sampling part located up to 2 m apart from the end of the rolled film, at a final sampling part located up to 2 m apart from the beginning of the rolled film, and further other sampling parts located after the first sampling part at intervals of about 100 m, followed by calculating an average content of nitrogen atoms of samples thus sampled, the content of nitrogen atoms of each sample is within the ±0.5% range based on the above average content of nitrogen atoms.

The heat-shrinkable film roll having the above properties is excellent in printability such as printing workability and adhesion for various types of ink, excellent in removable properties under alkaline conditions for alkaline-removable type ink, and further, regarding opening properties after cutting the film into label pieces, excellent in processability in a label fitting step without occurrence of fusion or blocking at a cut portion. Further, variability in these properties in the film roll can be reduced, thereby resulting in excellent processing stability in a printing step, a label cutting step, a label fitting step, and a removing step under alkaline conditions. Thus, a level of defectiveness can be reduced in each step. In particular, the film roll has an excellent aptitude, in particular, for label recycling in view of removable properties under alkaline conditions as well as adhesion for alkali-removable type ink which is removable in an alkaline solution.

Further, in view of film strength, environmental characteristics and the like, the thermoplastic resin film of the present invention is preferably a polyester film or a polystyrene film.

In a preferred process for producing the heat-shrinkable film roll of the present invention, at least one surface of the film is subjected to corona or plasma treatment under a nitrogen atmosphere. More preferably, corona or plasma treatment under a nitrogen atmosphere is performed at oxygen concentration in the nitrogen atmosphere of 1000 ppm or less, and variability in oxygen concentration is in the range of average oxygen concentration ±200 ppm.

When corona or plasma treatment under a nitrogen atmosphere is performed according to a conventional manner, and then the resultant film roll is processed by the post-processing as described about, the roll causes inferior ink adhesion, inferior ink removable properties in an aqueous alkaline solution and inferior label opening properties after cutting the film into label pieces depending on variability of steps for corona or plasma treatment process under a nitrogen atmosphere.

Further, in case of a heat-shrinkable film roll of 200 mm wide or more and 300 m long or more, surface properties of the heat-shrinkable film are liable to be varied, unless the present invention is applied. Then, it is significant to apply the present invention to such a case. The film having the above width and length is a preferred embodiment of the present invention because such a film is excellent in processing properties and handling properties throughout a printing step to an end product, and, in case of using alkali-removable type ink, inferior removable properties under alkaline conditions in a PET bottle-recycling process can be reduced.

In the heat-shrinkable resin film of the present invention, preferably, at least one surface of the film has a nitrogen atom content of 0.2% to 5.0%, and the nitrogen atom content is reduced by 50% or more after the film is immersed in an aqueous 1.5% NaOH solution at 85° C. for 15 minutes.

Preferably, both surfaces of the heat-shrinkable film of the present invention have peel strength of 5 N/15 mm width or less when the same surface portions of the film are bonded by heating at 75° C. and then peeled off from each other.

Preferably, at least one surface of the heat-shrinkable film of the present invention has a three-dimensional surface roughness SΔa (average three-dimensional gradient) in the range of 0.01 to 0.04, and the surface has substantially no projection of 1.89 μm high or more.

Preferably, at least one surface of the heat-shrinkable film of the present invention has wet tension of 45 mN/m or more and at least one surface of the film has specific surface resistance of $1 \times 10^{13}$ (Ω·cm).

MODE FOR CARRYING OUT THE INVENTION

Any material such as vinyl chloride resin, polystyrene resin and polyester resin may be used to form the thermoplastic resin film of the present invention. Preferably, the film is made of polyester resin or polystyrene resin because, in a heat shrinking step, such a resin can give a film having excellent shrink-finishing properties in a wide temperature range from low to high temperatures, which makes it possible to obtain fine shrink-finish appearance with less shrinkage spots, wrinkling and distortion. Further, beautiful gloss and clarity can be obtained. In the present invention, suitable ranges of the surface nitrogen content and wet tension are the same in both polyester resin and polystyrene resin.

As the polyester resin, a known (copolymerized) polyester obtained by condensation polymerization of a polyhydric alcohol component with a dicarboxylic acid component including one or more of an aromatic dicarboxylic acid, an ester forming derivative thereof and an aliphatic dicarboxylic acid can be used. Examples of the aromatic dicarboxylic acid include terephthalic acid, isophthalic acid, naphthalene-1,4- or -2,6-dicarboxylic acid, and 5-sodium sulfoisophthalic acid. Examples of the ester derivative include dialkyl ester derivatives and diaryl ester derivatives. Examples of the aliphatic dicarboxylic acid include dimer acids, glutaric acid, adipic acid, sebacic acid, azelaic acid, oxalic acid, and succinic acid. An oxycarboxylic acid such as p-oxybenzoic acid or a polycarboxylic acid such as trimellitic anhydride and pyromellitic anhydride may also be used together, as needed.

Examples of the polyhydric alcohol component include alkylene glycols such as ethylene glycol, diethylene glycol, dimerdiol, propylene glycol, triethylene glycol, 1,4-butanediol, neopentyl glycohol, 1,4-cyclohexanedimethanol, 1,6-hexanediol, 3-methyl-1,5-pentanediol, 2-methyl-1,5-pentanediol, 2,2-diethyl-1,3-propanediol, 1,9-nonanediol, and 1,10-decanediol; bisphenol compounds or alkylene oxide adducts of derivatives thereof; trimethylolpropane; glycerol; pentaerythritol; polyoxytetramethylene glycol; and polyethylene glycol. Although ε-caprolactone is not a polyhydric alcohol, it can also be used.

The polyester material which constitutes the polyester heat-shrinkable film can be used alone or in combination of two or more thereof. In case of using a polyester material alone, a homopolyester other than polyethylene terephthalate, such as polybutylene terephthalate, polycyclohexylene dimethylterephthalate or polyethylene naphthalate is preferred, because polyethylene terephthalate alone cannot generate heat-shrinkable properties.

A blend of two or more polyesters different in Tg is preferably used in view of heat-shrinkable properties. The mixture preferably comprises polyethylene terephthalate and a copolymerized polyester (or two or more copolymerized polyesters), but may comprise a combination of only copolymerized polyesters. Polybutylene terephthalate, polycyclohexylene dimethylterephthalate and polyethylene naphthalate can be used in combination thereof, or they can be used in combination with other copolymerized polyesters. In view of heat-shrinkable properties, the most preferred combination is a blend of three types of polyethylene terephthalate, polybutylene terephthalate and a copolymerized polyester composed of a diol component mixture of ethylene glycol and neopentyl glycol and terephthalic acid. In case of using two or more polyesters in combination, it is preferred to blend chips of the respective polymers in a hopper in view of production efficiency.

The polyester can be produced by conventional melt polymerization. Examples thereof include a so-called direct polymerization process in which an oligomer produced by a direct reaction of a dicarboxylic acid with a glycol is subjected to condensation polymerization; and a so-called transesterification process in which a dimethyl ester of a dicarboxylic acid is transesterified with a glycol, followed by condensation polymerization, and any of these processes can be used. The polyester may also be that produced by another polymerization process. The polymerization degree of the polyester is preferably 0.3 to 1.3 dl/g in terms of intrinsic viscosity.

In addition to a polymerization catalyst such as antimony oxide, germanium oxide and a titanium compound, a Mg salt such as magnesium acetate and magnesium chloride; a Ca salt such as calcium acetate and calcium chloride; a Mn salt such as manganese acetate and manganese chloride; a Zn salt such as zinc chloride and zinc acetate; or a Co salt such as cobalt chloride and cobalt acetate at concentration of 300 ppm or less in terms of each metal ion based on the amount of the polyester; and phosphoric acid or a phosphate ester derivative such as trimethyl phosphate ester and triethyl phosphate ester at concentration of 200 ppm or less in terms of phosphorus (P) can be added to the polyester in order to avoid troubles such as discoloration and gelation.

When concentration of the total metal ions other than the above-described polymerization catalyst exceeds 300 ppm and concentration of P exceeds 200 ppm, it causes not only significant discoloration of the polymer, but also remarkable lowering of heat resistance or hydrolysis resistance of the polymer. This is undesirable.

In view of heat resistance, hydrolysis resistance and the like, therefore, the molar atomic ratio (P/M) of the total P amount (P) to the total metal ion amount (M) is preferably 0.4 to 1.0. When the molar atomic ratio (P/M) is less than 0.4 or more than 1.0, it causes discoloration of a film or contamination of coarse particles into a film. This is undesirable.

There is no specific time to add the metal ion and the phosphoric acid or the derivative thereof but, in general, the metal ion is preferably added at the time of feeding starting materials, i.e., before the transesterification or the esterification, and the phosphoric acid or the like is preferably added before the condensation polymerization reaction.

If necessary, fine particles of silica, titanium dioxide, kaolin, calcium carbonate, or the like may be added, and further an antioxidant, an ultraviolet absorbing agent, an antistatic agent, a coloring agent, an antimicrobial agent, or the like may also be added.

The polystyrene heat-shrinkable film can be produced from a polystyrene polymer. The polystyrene polymer is a polymer produced by a known radical polymerization of one or more styrene type monomers such as styrene; alkyl styrene such as p-, m- or o-methylstyrene, 2,5-, 3,4- or 3,5-dimethylstyrene, and p-t-butylstyrene; halogenated styrene such as p-, m- or o-chlorostyrene, p-, m- or o-bromostyrene, p-, m- or o-fluorostyrene, and o-methyl-p-fluorostyrene; halogen-substituted alkylene styrene such as p-, m- or o-chloromethylstyrene; alkoxystyrene such as p-, m- or o-methoxystyrene and p-, m- or o-ethoxystyrene; carboxyalkylstyrene such as p-, m- or o-carboxymethylstyrene; alkylether styrene such as p-vinylbenzyl propyl ether; alkylsilylstyrene such as p-trimethylsilylstyrene; and vinylbenzyl dimethoxyphosphide, etc.

The styrene polymer may be used in the form of a mixture of a syndiotactic polymer and an atactic polymer. The styrene polymer preferably has weight average molecular weight (Mw) of 10000 or more, more preferably 50000 or more. If Mw is less than 10000, the film having excellent strength and elongation properties and excellent heat resistance can hardly be obtained.

Good properties can be obtained by blending thermoplastic resin or rubber with the styrene polymer. Preferred examples of such thermoplastic resin include polystyrene resin such as AS resin and ABS resin; a variety of polyesters described above; polyamide such as nylon 6, nylon 66, nylon 12, nylon 46, and polyhexamethyleneadipamide; and polyolefin such as polyethylene, polypropylene, and polybutene.

Preferred examples of the rubber component include rubbers comprising as a constituent component a styrene monomer unit, such as a styrene-butadiene block copolymer (SBS), modified SBS in which the butadiene moieties are partially or entirely hydrogenated (hereinafter referred to as "hydrogenated product"), a styrene-isoprene block copolymer (SIS), a SIS hydrogenated product, a methyl (meth) acrylate-butadiene-styrene copolymer, and an acrylonitrile-alkyl (meth)acrylate ester-butadiene-styrene copolymer. These copolymers have good dispersibility in the styrene polymer and therefore can exhibit a high physical property-improving effect.

Further, a microdomain of rubber may also be formed. Examples of the rubber that can be used in such a case include natural rubbers, polybutadiene, polyisoprene, polyisobutylene, neoprene, ethylene-propylene copolymer rubber, urethane rubber, silicone rubber, acrylic rubber, polyether-ester rubber, and polyester-ester rubber. The rubber may contain known additives similarly to the polyester.

The thermoplastic resin film of the present invention has excellent adhesion for various types of ink and excellent alkali-removable properties for alkali-removable type ink and can be useful for various applications. Hereinafter, the present invention will be illustrated with reference to an example of the heat-shrinkable film that would be particularly useful.

Preferably, the heat-shrinkable resin film of the present invention is that obtained by winding up a heat-shrinkable film having heat shrinkage in the maximum shrinkage direction of 20% or higher when a 10 cm×10 cm square sample cut out therefrom is immersed in hot water at 85° C. for 10 seconds, pulled out, subsequently immersed in water at 25° C. for 10 seconds, and then pulled out. Heat shrinkage of a film of less than 20% is not preferred because such a film has insufficient heat-shrinking ability and cannot be tightly fitted to a container when it is put and shrank on the container, which results in bad appearance. This is undesirable. The heat shrinkage is preferably 30% or more, more preferably 40% or more.

Herein, the heat shrinkage in the maximum shrinkage direction means heat shrinkage in a direction of the sample showing the maximum shrinking, and the maximum shrinkage direction can be defined by the lengthwise or crosswise direction of the square sample. The heat shrinkage (%) is a value determined by measuring the lengths of lengthwise and crosswise directions of a 10 cm×10 cm film sample after immersing the sample in hot water at 85° C.±0.5° C. for 10 seconds in an no-loaded state, pulling it out, subsequently immersing it in water at 25° C.±0.5° C. for 10 seconds in an no-load state, and then pulling out, followed by calculating according to the following equation (hereinafter, heat shrinkage in the maximum shrinkage direction determined under these conditions is simply referred to as "heat shrinkage").

Heat shrinkage=100×(length before shrinkage−length after shrinkage)÷(length before shrinkage)

Further, at least one surface of the thermoplastic resin film of the present invention contains nitrogen atoms, and the nitrogen atom content of the film surface is 0.1% to 3.0%. When the nitrogen atom content of the film surface is less than 0.1%, the film has insufficient adhesion for various types of ink and therefore the objectives of the present invention cannot be achieved. When the nitrogen atom content of the film surface is more than 3.0%, fusion or blocking can occur after cutting the film into label pieces, and lowering of lubricity is caused due to change in surface properties of the film. In the preferred embodiment of the present invention, the nitrogen atom content of the film surface is preferably 0.20% to 2.9%. In the more preferred embodiment, the nitrogen atom content of the film surface is 0.30% to 2.8%.

In the present invention, the film surface containing nitrogen atoms of the thermoplastic resin film should have wet tension of 36 mN/m or more. When the film surface has wet tension of less than 36 mN/m, insufficient adhesion for various types of ink is caused. In the preferred embodiment of the present invention, wet tension of the film surface is preferably 37 mN/m or more. In the more preferred embodiment, wet tension is 38 mN/m or more. Further, although the upper limit of wetting tension of the film surface is not specifically limited, it may be 58 mN/m or less in view of fusion or blocking after cutting the film into label pieces as well as film lubricity.

Hereinafter, a preferred process for producing the thermoplastic resin film that fulfills the above requirements will be illustrated. Conventionally, at the time of film formation or after formation of a film, one or both surfaces of not only a heat-shrinkable film but also another film is subjected to a corona treatment, flame treatment, plasma treatment, ultraviolet treatment, or the like under air atmosphere in order to improve adhesion for various types of ink. In particular, surface treatment by corona treatment under air atmosphere is most widely used for industrial production. When a heat-shrinkable film is subjected to corona treatment, like another film, wetting tension of the film surface is increased to improve adhesion for various type of ink as described above. Then, the present inventors have found that, although corona treatment improves alkali-removable properties with respect to the alkali-removable type ink, it is liable to cause fusion or blocking of a heat shrinkable film at the time of cutting the film into label pieces.

For example, in case of a polyester film, a heat-shrinkable film contains as a major constituent monomer component polyethylene terephthalate as well as, in order to obtain desired heat shrinkage, other monomer components such as 1,4-cyclohexanedimethanol and neopentyl glycol, which reduce crystallizability of the resultant polymer to render the polymer amorphous, and low Tg (glass transition temperature) monomer components such as 1,4-butanediol and 1,3-propanediol to lower Tg to develop heat shrinkage at a low temperature. In particular, because of the effect of the former monomer component for rendering the polymer amorphous, the heat-shrinkable film without surface treatment (untreated) has better ink adhesion than that of an untreated PET film.

When such a heat-shrinkable film is subjected to corona treatment at an energy level generally used for the treatment of a PET film, however, the surface of the heat-shrinkable film is excessively oxidized due to the effect of the former monomer component for rendering the polymer amorphous to increase surface tension undesirably, thereby being liable to cause fusion or blocking at the time of cutting the film into label pieces. Further, the lubricity of the film surface is changed to a less slippery state to deteriorate workability of the film. Furthermore, for example, when the film is stored in the form of a roll, blocking of film portions to each other disadvantageously occurs. In view of these problems, the corona treatment should be performed under mild conditions. Facilities for corona treatment of conventional PET films, however, are particularly difficult to perform such corona treatment under mild conditions in case of a heat-shrinkable film containing a large amount of a component which renders the polymer amorphous. Therefore, it is required to newly introduce a special power supply source and special electrode facilities.

It is possible to improve adhesion for ink by such corona treatment under mild conditions. However, when the corona treatment is performed to obtain a practically required level of adhesion for ink, there are problems that fusion or blocking occurs at the time of cutting the film into label pieces. Therefore, both of these properties are incompatible with each other. The present inventors have found that incorporation of nitrogen atoms into the film surface is effective for ensuring both ink adhesion and removable properties for alkali-removable type ink, and preventing fusion or blocking at the time of cutting the film into label pieces. This effect can be achieved by incorporating a specific amount of nitrogen atoms into the film surface. If the nitrogen atom content of the film surface is less than 0.1%, the film has insufficient adhesion for various types of ink and therefore the objective of the present invention cannot be achieved. If the nitrogen atom content of the film surface is more than 3.0%, fusion or blocking occurs after cutting the film into label pieces, and lowering of lubricity occurs due to change of surface properties of the film. In a preferred embodiment of the present invention, the nitrogen atom content of the film surface is 0.15% to 2.9%. In a more preferred embodiment of the present invention, the nitrogen atom content of the film surface is 0.2% to 2.8%. In the present invention, the nitrogen atoms in the film surface may be in the from of any of a nitrogen atom (N), or a nitrogen ion ($N^+$).

In conventional corona treatment under an air atmosphere, when wet tension of a film surface is about 38 mN/m or more, adhesion for various types of ink and removable properties of alkali-removable type ink can be obtained. However, such a film causes fusion or blocking after cutting the film into label pieces. When nitrogen atoms are incorporated into a film surface, wet tension can be increased to prevent fusion or blocking after cutting the film into label pieces.

Further, the alkali-removable type ink to be used for the thermoplastic resin film of the present invention means, for example, ink which exhibits an ink removal ratio of 90% or higher, when 1 g of a sample having an ink layer laminated on the heat-shrinkable film is cut into square-shaped flakes of 1 cm in each side and then stirred in 100 cc of a 3% aqueous NaOH solution (90° C.) for 30 minutes, followed by washing with water and drying. The removal of the ink layer is attributed to the fact that the ink layer can largely swell or be dissolved in alkaline hot water. Washing with weak alkaline hot water is usually performed for about 30 minutes; therefore, ink layers capable of coming off during the washing are suitable for practical use.

The method for giving the above properties to the ink layer, although it is not particularly limited, may involve, for example, the addition of a compound soluble or capable of swelling in alkaline hot water to ink usually used, for example, ink consisting of colorants such as pigments or dyes, binders, and volatile organic solvents. The compound soluble or capable of swelling in alkaline hot water may include inorganic salts such as sodium chloride, sodium sulfate, potassium nitrate, sodium acetate and ammonium sulfate; organic acids or their salts, such as ascorbic acid, sebacic acid and azelaic acid; high molecular weight polyethers such as polyethylene oxide and polytetramethylene oxide; polyacrylic acid or polymethacrylic acid or their metal salts, and copolymers thereof such as copolymers of polystyrene and acrylic compounds such as polyacrylic acid and/or polymethacrylic acid.

Examples of the above compound also include that in a liquid state at room temperature. Specific examples thereof include an alcohol such as methyl alcohol, ethyl alcohol, isopropyl alcohol, tert-butyl alcohol, cyclohexyl alcohol, and benzyl alcohol; a monomethyl, monoethyl, monopropyl or monobutyl ether or a monomethyl or monoethyl ester of a polyhydric alcohol such as ethylene glycol, diethylene glycol, triethylene glycol and pentaerythritol; and others such as dioxane, acetone, methyl ethyl ketone, diacetone alcohol, dimethylformamide, and tetrahydrofuran. Preferred are those with high boiling points, particularly with boiling points of 50° C. or higher, because they should remain in the ink layer. More specifically, monoalkyl ethers of polyhydric alcohols are particularly preferred because of their good solubility in alkaline hot water.

Hereinafter, a preferred process for producing the thermoplastic resin film that fulfills the above requirements will be illustrated. As a method for incorporation of nitrogen atom into at least one surface of the film, preferably, the film is subjected to corona or plasma treatment under a nitrogen atmosphere. By corona or plasma treatment under a nitrogen atmosphere, nitrogen atoms in the form of an atom (N) or an ion ($N^+$) are present in the film surface. Further, as a method for controlling the amount of nitrogen atoms in the film surface, facilities or treatment conditions of the corona or plasma treatment can be changed. For facilities, examples of changeable elements in corona treatment facilities include power supply frequency; a material, a shape and/or a number of discharge electrode(s); a material of a treatment roll; a gap between a discharge electrode and the film surface to be treated; and nitrogen gas concentration under a nitrogen atmosphere. Examples of changeable conditions include a film traveling speed, an atmosphere temperature and a roll surface temperature during the treatment.

Examples of preferred facilities for the corona treatment include, as the power supply frequency, the range of 8 kHz to 60 kHz. The material of the discharge electrodes is preferably aluminum or stainless steel. The discharge electrodes are preferably in the shape of a knife edge, a bar or a wire. The number of the discharge electrodes is preferably two or more so that the film surface can uniformly be treated. At least the surface material of the treatment roll, which serves as a counter electrode at the time of the corona discharge, should be made of a dielectric material. Preferred examples of the dielectric material include silicone rubber, Hypalon rubber, and an EPT rubber. At least the surface of the treatment roll is preferably covered by the dielectric material of 1 mm thick or more. The gap between the discharge electrodes and the film surface to be treated is preferably in the range of 0.2 mm to 5 mm.

For conditions, the treatment may be performed at any film traveling speed (throughput speed) within capability of the facilities. The atmosphere temperature may be selected from the range of about 15° C. to about 120° C. However, it is preferably 110° C. or lower, more preferably 100° C. or lower, in view of preventing a change in the physical properties of the heat-shrinkable film of the present invention. Further, the nitrogen concentration in the nitrogen atmosphere in terms of a remaining oxygen concentration at the time of replacing an air atmosphere with nitrogen to form the nitrogen atmosphere is preferably 2000 ppm or less, more preferably 1000 ppm or less, further more preferably 700 ppm or less.

The surface temperature of the treatment roll is preferably controlled by a temperature control unit. The treatment roll surface is preferably at a temperature of 30° C. to 70° C. If desired, a temperature control roll may be placed in front or back of the treatment roll.

The heat-shrinkable film roll of the present invention is characterized in that the roll is obtained by winding up a heat-shrinkable resin film having heat shrinkage in the maximum shrinkage direction of 20% or higher, when a 10 cm×10 cm square sample cut out therefrom is immersed in hot water at 85° C. for 10 seconds, pulled out, subsequently immersed in water at 25° C. for 10 seconds, and then pulled out, whose at least one surface has a content of nitrogen atoms of 0.1% to 4.0% and wet tension of 36 mN/m or higher, and further characterized in that, when the rolled film is sampled at a first sampling part located up to 2 m apart from the end of the rolled film and at other sampling parts located after the first sampling part at intervals of about 100 m and an average content of nitrogen atoms of each sample is calculated, then the content of nitrogen atoms of each sample is within the ±0.8% range based on the above average content of nitrogen atoms.

In the film wound into the heat-shrinkable film roll of the present invention, when the rolled film is sampled at a first sampling part located up to 2 m apart from the end of the rolled film, at a final sampling part located up to 2 m apart from the beginning of the rolled film and at other sampling parts located after the first sampling part at intervals of about 100 m and when heat shrinkage of each 10 cm×10 cm square sample cut out thereof is determined after immersing it in hot water at 85° C. for 10 seconds to calculate average heat shrinkage of all the samples, the heat shrinkage of each sample should be within ±5% range of the average heat shrinkage. The phrase "at intervals of about 100 m" means that respective samples may be cut out at sampling parts located at intervals of about 100 m±1 m.

Hereinafter, the above requirements will be illustrated in more detail. For example, in the case that the heat-shrinkable film of 498 m long is wound into a roll, the first sample (i) (10 cm×10 cm) is cut out at a sampling part located up to 2 m apart from the end of the film roll. For convenience, the square sample is cut from the film so that the sample has sides along the lengthwise and crosswise directions of the film (not cut slantwise). Then, the second sample (ii) is cut out at a sampling part located at 100 m apart from the first sampling part. Similarly, the third sample (iii), the fourth sample (iv), and the fifth sample (v) are cut out at sampling parts located 200 m, 300 m, and 400 m apart from the previous sampling parts, respectively. The remainder is less than 100 m long, and therefore the sixth (the final) sample (vi) is cut out at a sampling part located up to 2 m apart from the beginning of the film roll. There is a high possibility that heat-shrinkable properties significantly vary in the beginning and end parts of the film roll. As defined above, therefore, samples should be cut out at the parts located up to 2 m apart from the beginning (the final sample) and end of the film roll (the first sample), respectively.

The surface nitrogen atom content of each sample is determined to calculate an average nitrogen atom content of samples. "The average nitrogen content ±0.8%" means that, when the average nitrogen content is represented by X (%) and the nitrogen content of the sample (i) is represented by Y1 (%), |X−Y1| (the absolute value of X−Y1) is less than 0.8 (%) and, likewise, |X−Yn| values with respect to the nitrogen contents Y2 to Y6 (%) of the samples (ii) to (vi) are also less than 0.8 (%). In other words, if the difference between the maximum value of Yn (Ymax) and X and the difference between the minimum value of Yn (Ymin) and X are within ±0.8%, respectively, the above requirements of the present invention are satisfied.

Thus, variability in the surface nitrogen atom content of individual labels, bags or the like can be reduced by reducing variability in the nitrogen atom content of the film surface over one heat-shrinkable film roll, thereby lowering defectiveness in respective steps such as a printing step, a covering and shrinking step, a PET bottle recycling step, and the like. A degree of variability in the surface nitrogen atom content is preferably within ±0.7%, more preferably within ±0.6% of average heat shrinkage.

Hereinafter, a method for fulfilling the above requirements for the present invention and for controlling the surface nitrogen atom content will be illustrated. One of causes of variability in the nitrogen atom content of the film surface is variability in nitrogen concentration of an atmosphere at the time of performing corona or plasma treatment. When a nitrogen atmosphere is formed by enclosure of corona or plasma treatment facilities and replacing the inner air with nitrogen and a film is traveled through therein, the air can be allowed to flow into the facilities associated with the traveling film to vary nitrogen concentration of the nitrogen atmosphere. Preferably, such a phenomenon should be controlled. For example, as a method for controlling this, first, the gap between the film and an enclosure unit is adjusted to preferably 0.4 mm or less, more preferably 0.3 mm or less, and the gap is covered with a plastic film or a cloth to cut the associated flow. Further, in another effective method, the enclosure unit may have a two or more-layer structure in which nitrogen may be separately supplied so as to cut the associated flow in the outer layer side. As described above, oxygen concentration in the nitrogen atmosphere for performing the corona or plasma treatment is 1000 ppm or less, and variability in oxygen concentration over the entire length of the film is preferably within ±200 ppm, more preferably within ±150 ppm or less, further more preferably within ±150 ppm, from average oxygen concentration.

Removable properties of ink under alkaline conditions can be further enhanced by adjusting the surface nitrogen atom content of the heat-shrinkable resin film of the present invention to 50% or more in terms of a reducing rate after alkali immerse treatment because of removal action of nitrogen atoms of the film surface, in addition to action resulting from removable properties of alkali-removable type ink itself under alkaline conditions. After the film is immersed in an aqueous 1.5% NaOH solution at 85° C. for 15 minutes, the nitrogen atom content is preferably reduced by 50% or more, more preferably by 60% or more, further more preferably by 65% or more in terms of a reducing rate.

Further, preferably, both surfaces of the heat-shrinkable film of the present invention have peel strength of 5 N/15 mm width or less, when the same side surface portions of the film are bonded by heating at 75° C. and then peeled from each other. When this peel strength after bonding the same surface portions by heating at 75° C. exceeds 5 N/15 mm, fusion or blocking occurs particularly after a high-speed S label cutting step. In preferred embodiment of the present invention, the peel strength after bonding the same surface portions by heating at 75° C. is 4.5 N/15 mm width or less. In a more preferred embodiment, the peel strength after bonding the same surface portions by heating at 75° C. is 4 N/15 mm width or less.

Further, preferably, both surfaces of the heat-shrinkable film of the present invention have peel strength of 7 N/15 mm width or less, when the same side surface portions of the film are bonded by heating at 85° C. and then peeled from each other. More preferably, the peel strength of both surfaces after bonding the same surface portions by heating at 85° C. is 6 N/15 mm width or less. Further more preferably, the peel strength of both surfaces after bonding the same surface portions by heating at 85° C. is 5 N/15 mm width or less.

The heat-shrinkable polyester film of the present invention is excellent in film forming properties and workability, in particular, at high speed and can be wound up as a continuous length film because at least one surface of the film has a three-dimensional surface roughness $S\Delta a$ (average three-dimensional gradient) in the range of from 0.01 to 0.04, and the surface has substantially no projection of 1.89 μm high or more. When $S\Delta a$ is less than 0.01, inferior film forming properties and inferior workability are resulted at high speed, and it is difficult to wind up as a continuous length film. When $S\Delta a$ is more than 0.04, transparency of the film is deteriorated and resistance to abrasion becomes inferior. Further, in the film roll of the present invention, preferably, the surface has substantially no projection of 1.89 μm high or more. When the surface has a projection of 1.89 μm high or more, in addition to deterioration of transparency, formation of white powder is caused by inferior resistance to abrasion, and missing of printing is caused due to the projection itself. Film forming properties, workability and handling properties at high speed are improved by defining the above specific range of the three-dimensional roughness $S\Delta a$ and the height of projection and, when a haze of the film is adjusted to 12 or less, they becomes more desirable.

Hereinafter, a method of forming the above projection will be illustrated, in particular, with respect to a case where polyester resin is used. Inorganic particles, organic salt particles or crosslinked polymer particles can be added as a lubricant. Examples of the inorganic particles include particles of calcium carbonate, kaolin, talc, magnesium carbonate, barium carbonate, calcium sulfate, barium sulfate, lithium phosphate, calcium phosphate, magnesium phosphate, aluminum oxide, silicon oxide, titanium oxide, zirconium oxide, and lithium fluoride.

In particular, for the purpose of producing the film having good handling properties as well as a low haze, silica particles in the form of aggregates produced by aggregation of primary particles are preferably used.

Examples of the organic salt particles include particles of calcium oxalate and terephthalate salt with calcium, barium, zinc, manganese, magnesium, or the like.

Examples of the crosslinked polymer particles include particles of a polymer or copolymer of a vinyl type monomer such as divinylbenzene, styrene, acrylic acid, and methacrylic acid. Other organic particles such as particles of polytetrafluoroethylene, banzoguanamine resin, thermosetting urea resin, thermosetting phenol resin, or the like may be used.

As a method of addition of the above lubricant, for example, there is dispersion of the lubricant in a polyester to be used as a raw material of the film polyester during its polymerization step, or addition of the lubricant to the polyester after melting the polymerized polyester. For the purpose of uniformly dispersing the lubricant in the film roll, preferably, after the lubricant is dispersed in the polyester by either of the above methods, the shape of polymer chips of the polymer containing the lubricant is adjusted so as to prevent a segregation phenomenon of raw materials in a hopper. For example, in case of a polyester, polyester chips produced by taking a polyester strand in a melted state out from a polymerization apparatus, immediately cooling it with water, and then cutting it with a strand cutter are in the shape of a cylindrical shape having an elliptical bottom. In such a case, it is preferred to use different kinds of raw material chips each of which has a major axis size of the elliptical bottom, a minor axis size of the elliptical bottom, and a cylinder height on the average within the range of ±20%, preferably ±15% of the corresponding sizes of the chips most mainly used, respectively.

The three-dimensional surface roughness SΔa and the height of projection as described above can be controlled by adjusting the lubricant particles and the film forming conditions. In so far as the three-dimensional surface roughness SΔa and the height of projection is fallen within the given range, the type and the amount of the lubricant particles are not specifically limited. However, preferably, the average particle diameter of the lubricant is 0.01 μm to 4 μm, in particular, 0.05 μm to 3 μm, and the amount of the lubricant to be added is 0.02% by weight to 0.5% by weight, in particular, 0.03% by weight to 0.4% by weight.

When the lubricant has an average particle diameter of less than 0.01 μm, it is difficult to adjust the three-dimensional roughness SΔa to 0.01 or more. When it is more than 4 μm, the film being substantially free from a projection of 1.89 μm high or more is hardly obtained. Further, when the amount to be added is less than 0.02% by weight, it is difficult to adjust the three-dimensional roughness SΔa to 0.01 or more. When it is more than 0.5% by weight, the film having the three-dimensional roughness SΔa to 0.04 or less is hardly obtained.

The type of the lubricant added may also vary orientation conditions. In so far as the three-dimensional surface roughness SΔa and the height of projection are fallen in the given range, any combination of orientation conditions may be used. Preferably, the draw ratio in the maximum drawing direction is 2.3 to 7.3 times, preferably 2.5 to 6.0 times. If the draw ratio is outside the above range, the formation of surface projections is insufficient.

At least one surface of the heat-shrinkable film of the present invention should have specific surface resistance of $1 \times 10^{13}$ (Ω·cm) or less. When the specific surface resistance of the film is more than $1 \times 10^{13}$ (Ω·cm), the film is likely to be electrostatically charged to generate and accumulate static electricity. This is not preferred because the film causes various troubles due to static interference. For example, in a tubing step, a label fitting step or the like, such a film winds itself around a roll, gives an electric shock to a human body, or causes lowering of working efficiency due to a difficulty in handling. In a printing step, such a film causes ink floating, opening failure due to static electricity, or smudges on the film surface to reduce commercial value of products. The specific surface resistance of the film is preferably $1 \times 10^{12}$ (Ω·cm) or less, more preferably $1 \times 10^{12}$ (Ω·cm) or less.

In the present invention, the specific surface resistance can be controlled to the specific range, for example, by:

(1) producing the film by compounding an antistatic agent in the above polyester composition;

(2) applying an antistatic agent to the surface of the film in the film production step;

(3) applying an antistatic agent to the surface of the film produced by the above-described method; and the like.

The antistatic agent to be used is not specifically limited and any of nonionic, anionic, cationic and amphoteric antistatic agents can be used alone or in combination thereof. Further, the antistatic agent may be a low or high molecular weight type agent. In the above method (1), since the antistatic agent should be heat-resistant, a nonionic or anionic antistatic agent is preferably used. In the above method (2) or (3), an ionic antistatic agent is preferably used because the effect thereof can be exerted even in a small amount. In the above method (2) or (3), the antistatic agent alone can be applied to the film, or it may be diluted with or dissolved in a solvent or water before application. It is preferred to apply the antistatic agent by diluting with or dissolving in a solvent or water because a uniform coating can be formed. The solvent to be used for the above application is, preferably, an organic solvent whose boiling point is as low as possible. In a preferred embodiment, a lower alcohol is used.

Although the thickness of the thermoplastic resin film of the present invention is not specifically limited, in case of using the film as a heat-shrinkable label, for example, the thickness of the film is preferably 10 to 200 μm, more preferably 20 to 100 μm.

EXAMPLES

The present invention will be illustrated in more detail with reference to the following Examples. However, these Examples are not intended to limit the scope of the present invention, and modifications within the spirit of the present invention will be encompassed by the scope of the present invention. The methods for determining the physical properties of the films prepared in Examples and Comparative Examples are as follows.

(1) Heat Shrinkage

The film was cut along the traveling direction and the crosswise direction thereto to obtain a square sample of 10 cm×10 cm. The sample was immersed in hot water at 85° C.±0.5° C. for 10 seconds with no-load to allow to heat-shrinking and then immersed in water at 25° C.±0.5° C. for 10 seconds, followed by measuring lengths of the lengthwise and crosswise directions of the sample. The heat shrinkage was calculated according to the following formula:

Heat shrinkage (%)=100×(length before shrinkage−length after shrinkage)÷(length before shrinkage)

The direction of the larger heat shrinkage was defined as the maximum shrinkage direction.

(2) Nitrogen Atom Content of Film Surface

The nitrogen atom content was determined by measuring the ratio of the amount of the nitrogen atoms to the amount of the total atoms in the film surface with an X-Ray Photoelectron Spectroscopy analyzer (ESCA analyzer).

(3) Wet Tension of Film Surface

The wet tension of the film surface was determined by the method according to JIS K6768.

(4) Ink Adhesion

Both ink "Daiecolo SRF 915 rouge" and "SRF thinning solvent No. 2" manufactured by Dainichiseika Color & Chemicals Mfg. Co., Ltd. were mixed in ratio of 100:10 by weight. The mixture was applied to the film using Meyer bar #5 and immediately dried for 15 seconds with air form a dryer at room temperature. A cellophane tape was attached to the sample and then peeled off. Then, occurrence of ink pinholes was evaluated according to the following criteria:
 ○: no occurrence of ink pinholes
 Δ: occurrence of ink pinholes having less than 1 mm size
 x: occurrence of ink pinholes with those having 1 mm size or more (5) Alkali Removable Properties of Ink Ink was applied to the film surface according to the same method in the above section (4). The film was cut into a piece of 2 cm×20 cm to obtain a sample. The sample was immersed in an aqueous 1.5% NaOH solution controlled at 85° C.±2° C. for 20 minutes, taken out, then immediately immersed in water at 25° C.±2° C. for 20 seconds, and taken out. The removable conditions of the ink layer were visually evaluated with the following criteria:
 ○: The link layer was entirely removed.
 Δ: The ink layer was partially removed or could easily be removed by rubbing the ink layer with a cotton swab after the sample was taken out.
 x: The ink layer was not removed and could not be removed by rubbing the ink layer with a cotton swab after the sample was taken out.

(6) Opening Properties after Label Cutting

The heat-shrinkable film was slit and then solvent-welded with 1,3-dioxolane with a center-sealing machine to form a tube. The tube was wound into a roll in a doubling state. The tube was then continuously cut with a cutter (into 200 label pieces) to form heat-shrinkable film labels. All the resulting heat-shrinkable film labels were manually opened, and the opening properties of the cut portions were evaluated using the following criteria:
 ○: The cut portions could be opened without resistance.
 Δ: The cut portions could be opened sometimes with weak resistance.
 x: Some cut portions could not be opened.

(7) Energy Conversion Value per Film Area in Surface Treatment

The value was calculated according to the following equation:

Energy conversion value per film area in surface treatment ($kW/m^2 \cdot min$)=(current value of high-frequency power supply unit (A)×voltage (V)) ÷electrode width (m)×film traveling speed (m/min)

(8) Lowering Rate of Nitrogen Atom Content after Immersion in Aqueous 1.5% NaOH Solution at 85° C.

The film was cut along the main shrinkage direction and the crosswise direction thereto to obtain a rectangular sample of 15 cm×10 cm. The sample was immersed in an aqueous 1.5% NaOH solution at 85° C.±0.5° C. for 15 minutes with no-load and taken out, and then the surface was washed with distilled water. The surface nitrogen atom content of the film was determined according to the method in the above section (2), and the lowering rate was calculated according to the following equation:

Lowering rate of nitrogen atom content (%)=100× (nitrogen atom content before treatment−nitrogen atom content after treatment)÷(nitrogen atom content before treatment)

(9) Heat Seal Properties

Surface portions of the film were bonded by heating with a heat sealer at the sealing bar surface temperature of the evaluation temperature ±0.5° C. under pressure of 40 $N/cm^2$ for 300 seconds. A sample of 15 mm wide was cut out of the film and measured peel strength with a tensile tester.

(10) Three-Dimensional Surface Roughness SΔa

Surface roughness of the film was measured with a tracer type three-dimensional surface roughness tester (SE-3AK manufactured by Kosaka Laboratory Ltd.) under the conditions of a needle radius of 2 μm and a load of 30 mg. The measurement was performed over a length of 1 mm at a cut-off value of 0.25 mm in the lengthwise direction of the film. In the measurement, 500 points were taken at a pitch of 2 μm, and the height at each point was input into a three-dimensional roughness analyzer (SPA-11). Similar operations were performed continuously 150 times at intervals of 2 μm toward the crosswise direction of the film, namely over a length of 0.3 mm toward the crosswise direction of the film, and the data were input into the analyzer. The analyzer was then used to calculate SΔa. SΔa is an average three-dimensional gradient and is defined as follows. When Δr represents a change in the average circle radius (r) of the area and number of the particles obtained by cutting the surface structure (based on mean surface level) with each cut surface, ΔZ/Δr is calculated at each level of the cut surface. The average of the calculated values is defined as the average three-dimensional gradient.

(11) Number of Projections in Film Surface

Aluminum was vapor-deposited on the surface of the film under vacuum. A two-beam interference microscope equipped with a 0.54 μm wavelength filter was used to observe a 7 or more-ply ring that was formed around the projection (corresponding to a projection of 1.89 μm high or more). The number of such rings was counted in an area of 1.3 $mm^2$ and calculated per unit area.

(12) Traveling Properties and Abrasion Resistance of Film

The film was slit into narrow tapes. The resulting tape was traveled at high speed for long time while rubbing with a metal guide roll. After the fretting against the guide roll, the tension of the tape and the amount of white powder produced on the surface of the guide roll were rated on a scale of 1 to 5 according to the following criteria, respectively.

(i) Traveling Properties
 1: high tension (many scratches)
 2: fairly high tension (fairly many scratches)
 3: medium tension (some scratches)
 4: fairly small tension (few scratches)
 5: small tension (no scratch)

(ii) Abrasion Resistance
 1: occurrence of a very large amount of white powder
 2: occurrence of a large amount of white powder
 3: a little occurrence of white powder 4: little occurrence of white powder
5: no occurrence of white powder Synthesis Example 1

Synthesis of Polyester

A stainless steel autoclave equipped with a stirrer, a thermometer, and a fractional reflux condenser was charged with 100 mol % of dimethyl terephthalate (DMT) as a dicarboxylic acid component, and 72 mol % of ethylene glycol (EG) and 30 mol % of neopentyl glycol (NPG) as a glycol component so that the amount of the glycol is 2.2-fold of that of the methyl ester in terms of the molar ratio. Further, 0.05 mol of zinc acetate (based on the acid component) as a transesterification catalyst and 0.025 mol of antimony trioxide (based on the acid component) as a condensation polymerization catalyst were added thereto, and transesterification was performed while the methanol produced was distilling off from the reaction system. Then, a condensation polymerization reaction was performed at 280° C. under reduced pressure of 26.7 Pa to obtain Polyester A having intrinsic viscosity of 0.73 dl/g.

Synthesis Examples 2 and 3

According to the same manner as that described in Synthesis Example 1, Polyester raw material chips B and C as shown in Table 1 were produced, respectively. In the table, BD represents 1,4-butanediol. The polyesters had intrinsic viscosity of 0.72 dl/g for Chip B and 1.20 dl/g for Chip C, respectively.

In case of adding an inorganic lubricant, in any case, the inorganic lubricant to be used was added to Polyester B to prepare a masterbatch containing 0.7% by weight of the inorganic lubricant, and a necessary amount thereof was used. The addition of the lubricant was performed by dispersing lubricant in the ethylene glycol in advance and then subjecting to the above polymerization.

Further, in case of adding an antistatic agent to the polyester composition, in any case, the antistatic agent to be used was added to Polyester B to prepare a masterbatch containing 1.25% by weight of the antistatic agent, and a necessary amount thereof was used.

Example 1

Each of chips obtained in the above Synthesis Examples was separately pre-dried. As shown in Table 1, while 53% by weight of Chip A, 37% by weight of Chip B and 10% by weight of Chip C were separately and continuously supplied with a metering screw feeder to a hopper provided right over an extruder, they are mixed in the hopper, and melt-extruded at 280° C. with a single screw extruder, and then quenched to obtain an unoriented film of 180 μm thick.

The above unoriented film was pre-heated at 100° C. for 10 seconds and then oriented 4.0 times in the crosswise direction at 80° C. with a tenter and subsequently heated at 80° C. for 10 seconds to obtain a heat-shrinkable polyester of 45 μm thick. The film was then introduced into a corona treatment apparatus whose treatment electrode and treatment section were enclosed and continuously supplied with nitrogen so that the air in the apparatus was replaced to form a nitrogen atmosphere. The film was subjected to corona treatment under the nitrogen atmosphere under the conditions as shown in Table 2. At this time, a high-frequency power supply unit manufactured by Kasuga Electric Works Ltd. was used; an oscillation frequency was 45 kHz±3 kHz; the treatment electrode was a bar type made of aluminum; a gap between the treatment electrode and the film was 0.5 mm; the treatment roll having a silicone rubber surface was used; the treatment roll surface temperature was 40° C.; and the concentration of oxygen in the nitrogen atmosphere produced by replacing the air with nitrogen used as an index to the nitrogen concentration of the nitrogen atmosphere was 700 ppm. The physical property values of the resulting films are shown in Table 2.

Comparative Example 1

According to the same manner as that described in Example 1, a heat-shrinkable polyester film of 45 μm thick was produced except that the film was not subjected to the corona treatment under the nitrogen atmosphere after the film formation. The physical property values of the resulting film are shown in Table 2.

Example 2

According to the same manner as that described in Example 1, an unoriented film was obtained. The unoriented film was pre-heated at 100° C. for 10 seconds and then oriented 4.0 times in the crosswise direction at 80° C. with a tenter and subsequently heated at 80° C. for 10 seconds to obtain a heat-shrinkable polyester film of 45 μm thick. The film was then introduced into a corona treatment apparatus whose treatment electrode and treatment section were enclosed and continuously supplied with nitrogen so that the air in the apparatus was replaced with a nitrogen atmosphere. The film was subjected to corona treatment under the same nitrogen atmosphere as that of Example 1 under the conditions as shown in Table 2. The physical property values of the resulting heat-shrinkable film are shown in Table 2.

Comparative Example 2

According to the same manner as that described in Example 1, an unoriented film was obtained. The unoriented film was pre-heated at 100° C. for 10 seconds and then oriented 4.0 times in the crosswise direction at 80° C. with a tenter and subsequently heated at 80° C. for 10 seconds to obtain a heat-shrinkable polyester film of 45 μm thick. The film was then introduced into a corona treatment apparatus under an air atmosphere and subjected to corona treatment under the conditions as shown in Table 2. At this time, the treatment facilities were the same as those used in Example 1. The physical property values of the resulting heat-shrinkable film are shown in Table 2.

Comparative Example 3

According to the same manner as that described in Example 1, an unoriented film was obtained. The unoriented film was pre-heated at 100° C. for 10 seconds and then oriented 4.0 times in the crosswise direction at 80° C. with a tenter and subsequently heated at 80° C. for 10 seconds to obtain a heat-shrinkable polyester film of 45 μm thick. The film was then introduced into a corona treatment apparatus under a nitrogen atmosphere and subjected to corona treatment under the conditions as shown in Table 2. The nitrogen atmosphere had an oxygen concentration of 3200 ppm, and the treatment facilities were the same as those used in Example 1. Thus, a heat-shrinkable film was obtained.

The compositions of raw materials and the physical property values of the films are shown in Tables 1 and 2.

TABLE 1

| | Composition of Polyester (mol %) | | | | Composition of Film (mass %) | | | | |
|---|---|---|---|---|---|---|---|---|---|
| | Dicarboxylic Acid Component | Diol Component | | | | | | Comp. | Comp. | Comp. |
| | DMT | EG | NPG | BD | Ex. 1 | Ex. 2 | Ex. 1 | Ex. 2 | Ex. 3 |
| Chip A | 100 | 70 | 30 | — | 53 | 53 | 53 | 53 | 53 |
| Chip B | 100 | 100 | — | — | 37 | 37 | 37 | 37 | 37 |
| Chip C | 100 | — | — | 100 | 10 | 10 | 10 | 10 | 10 |

TABLE 2

| | Corona Treatment Conditions | | | | | | | | |
|---|---|---|---|---|---|---|---|---|---|
| | Atmosphere | Oxygen Conc. of the Atmosphere (ppm) | Conversion Value of Surface Treatment Energy (KW/m²·min) | Heat Shrinkage (%) | Nitrogen Atom Content of Film Surface (%) | Wet Tension (mN/m) | Ink Adhesion | Alkali Removable Properties | Opening Properties after Label Cutting |
| Example 1 | Nitrogen | 700 | 0.20 | 49.5 | 0.4 | 53.5 | ○ | ○ | ○ |
| Example 2 | Nitrogen | 700 | 0.52 | 48.5 | 1.0 | 58.0 | ○ | ○ | ○ |
| Comp. Example 1 | — | — | — | 49.5 | 0 | 35.0 | x | Δ | ○ |
| Comp. Example 2 | Air | 205000 | 0.20 | 49.0 | 0 | 58.0 | ○ | ○ | x |
| Comp. Example 3 | Nitrogen | 3200 | 0.20 | 49.0 | 0 | 56.0 | ○ | ○ | x |

Example 3

Each of chips obtained in the above Synthesis Examples was separately pre-dried. As shown in Table 3, while 53% by weight of Chip A, 37% by weight of Chip B and 10% by weight of Chip C were separately and continuously supplied with a metering screw feeder to a hopper provided right over an extruder, they are mixed in the hopper, and melt-extruded at 280° C. with a single screw extruder, and then quenched to obtain an unoriented film of 180 μm thick.

The above unoriented film was pre-heated at 100° C. for 10 seconds and then oriented 4.0 times in the crosswise direction at 80° C. with a tenter and subsequently heated at 80° C. for 10 seconds to form a heat-shrinkable polyester film of 45 μm thick and 1000 m long or over. The film was then introduced into a corona treatment apparatus whose treatment electrode and treatment section were doubly enclosed to form a two-layer structure. Nitrogen was continuously supplied to each part of the two-layer structure so that the air in the apparatus was replaced to form a nitrogen atmosphere. The film was subjected to corona treatment under the nitrogen atmosphere under the conditions as shown in Table 2. At this time, a high-frequency power supply unit manufactured by Kasuga Electric Works Ltd. was used; a conversion value of surface energy was 0.20 (KW/m²·min); an oscillation frequency was 45 kHz±3 kHz; the treatment electrode was a bar type made of aluminum; a gap between the treatment electrode and the film was 0.5 mm; the treatment roll having a silicone rubber surface was used; the treatment roll surface temperature was 40° C.; a gap between the film and the enclosing device was 0.4 mm; and the gap was covered with cotton cloth (velveteen). The resulting film of 400 mm wide and 1000 m long was wound around a paper tube to obtain a heat-shrinkable film roll. When the film was formed continuously over 1000 m long, the oxygen concentration in the nitrogen atmosphere was within the range of 655 ppm±102 ppm. The physical property values of the resulting film roll are shown in Table 4.

Example 4

According to the same manner as that described in Example 3, an unoriented film was obtained. The unoriented film was pre-heated at 100° C. for 10 seconds and then oriented 4.0 times in the crosswise direction at 80° C. with a tenter and subsequently heated at 80° C. for 10 seconds to obtain a heat-shrinkable film of 45 μm thick. The film was then introduced into a corona treatment apparatus whose treatment electrodes and treatment section were enclosed and continuously supplied with nitrogen so that the air in the apparatus was replaced to form a nitrogen atmosphere. The film subjected to corona treatment with a conversion value of surface treatment energy of 0.52 kW/m²·min under the nitrogen atmosphere in the same treatment facilities as those in Example 3 and wound into a heat-shrinkable film roll. At this time, when the film was formed continuously in the length of 1000 m, the oxygen concentration of the nitrogen atmosphere was within the range of 128 ppm±72 ppm. The physical property values of the resulting film roll are shown in Table 4.

Comparative Example 4

According to the same manner as that described in Example 3, an unoriented film was obtained. The unoriented film was pre-heated at 100° C. for 10 seconds and then oriented 4.0 times in the crosswise direction at 80° C. with a tenter and subsequently heated at 80° C. for 10 seconds to obtain a heat-shrinkable polyester film of 45 μm thick. The film was then introduced into a corona treatment apparatus under a nitrogen atmosphere and subjected to corona treatment with a conversion value of surface treatment energy of 0.05 kW/m²·min. At this time, the same corona treatment facilities as those of Example 3 were used. The gap between the film and the enclosing device was 0.8 mm and the gap was not covered. At this time, when the film was formed continuously in the length of 1000 m, the oxygen concentration in the nitrogen atmosphere was within the range of 2228 ppm±395 ppm. Thus, a heat-shrinkable film roll was obtained. The physical property values of the resulting film roll are shown in Table 4.

The compositions of raw materials and the physical property values of the films are shown in Tables 3 and 4.

TABLE 3

| | Composition of Polyester (mol %) | | | | | | |
|---|---|---|---|---|---|---|---|
| | Dicarboxylic Acid Component | Diol Component | | | Composition of Film (mass %) | | |
| | DMT | EG | NPG | BD | Example 3 | Example 4 | Comp. Example 4 |
| Chip A | 100 | 70 | 30 | — | 53 | 53 | 53 |
| Chip B | 100 | 100 | — | — | 37 | 37 | 37 |
| Chip C | 100 | — | — | 100 | 10 | 10 | 10 |

TABLE 4

| | Nitrogen Atom Content of Film Surface (%) | | | | | Wet Tension | | Heat | Ink Adhesion | Alkali-Removable | Opening |
|---|---|---|---|---|---|---|---|---|---|---|---|
| | Average (X) | Maximum ($Y_{max}$) | Minimum ($Y_{min}$) | $Y_{max} - X$ | $Y_{min} - X$ | Average (W) | Minimum ($Z_{min}$) | Shrinkage (%) | Defectiveness (%) | Defectiveness (%) | Defectiveness (%) |
| Ex. 3 | 0.4 | 0.7 | 0.2 | 0.3 | 0.2 | 54 | 53 | 49.5 | 0 | 0 | 0 |
| Ex. 4 | 1.1 | 1.3 | 0.8 | 0.2 | 0.3 | 58 | 56 | 48.8 | 0 | 0 | 0 |
| Comp. Ex. 4 | 0.2 | 0.4 | 0 | 0.2 | 0.2 | 35 | 34 | 49.2 | 62.5 | 30.5 | 0 |

Example 5

Each of chips obtained in the above Synthesis Examples was separately pre-dried. As shown in Table 5, while 53% by weight of Chip A, 37% by weight of Chip B and 10% by weight of Chip C were separately and continuously supplied with a metering screw feeder to a hopper provided right over an extruder, they are mixed in the hopper, and melt-extruded at 280° C. with a single screw extruder, and then quenched to obtain an unoriented film of 180 μm thick.

The above unoriented film was pre-heated at 100° C. for 10 seconds and then oriented 4.0 times in the crosswise direction at 80° C. with a tenter and subsequently heated at 80° C. for 10 seconds to form a heat-shrinkable polyester of 45 μm thick. The film was then introduced into a corona treatment apparatus whose treatment electrode and treatment section were doubly enclosed and nitrogen was continuously supplied to form a nitrogen atmosphere. The film was subjected to corona treatment under the nitrogen atmosphere under the conditions as shown in Table 5. At this time, a high-frequency power supply unit manufactured by Kasuga Electric Works Ltd. was used; an oscillation frequency was 45 kHz±3 kHz; the treatment electrode was a bar type made of aluminum; a gap between the treatment electrode and the film was 0.4 mm; the treatment roll having a silicone rubber surface was used; both treatment atmosphere temperature and treatment roll surface temperature were 40° C.; and the surface temperature of the film upon treatment was also 40° C. A gap between the film and the enclosing device was 0.3 mm, and the gap was covered with cotton cloth (velveteen). When the film was produced, the oxygen concentration in the nitrogen atmosphere was within the range of 270 ppm. The physical property values of the resulting film roll are shown in Table 6.

Example 6

According to the same manner as that described in Example 5, an unoriented film was obtained. The unoriented film was pre-heated at 100° C. for 10 seconds and then oriented 4.0 times in the crosswise direction at 80° C. with a tenter and subsequently heated at 80° C. for 10 seconds to obtain a heat-shrinkable film of 45 μm thick. The film was then introduced into a corona treatment apparatus whose treatment electrodes and treatment section were enclosed and continuously supplied with nitrogen to form a nitrogen atmosphere. The film subjected to corona treatment under the conditions as shown in Table 5. The same treatment facilities as those in Example 5 were used to obtain a heat-shrinkable polyester film. The physical property values of the resulting film roll are shown in Table 6.

Example 7

According to the same manner as that described in Example 5, an unoriented film was obtained. The unoriented film was pre-heated at 100° C. for 10 seconds and then oriented 4.0 times in the crosswise direction at 80° C. with a tenter and subsequently heated at 80° C. for 10 seconds to obtain a heat-shrinkable polyester film of 45 μm thick. The film was then introduced into a corona treatment apparatus under a nitrogen atmosphere and subjected to corona treatment with a conversion value of surface treatment energy of 0.15 kW/m²/min. The same corona treatment facilities as those of Example 5 were used. The gap between the film and the enclosing device was 0.8 mm and the gap was not covered. At this time, the oxygen concentration of the nitrogen atmosphere was 2100 ppm. The physical property values of the resulting film are shown in Table 6.

Comparative Example 5

According to the same manner as that described in Example 5, a heat-shrinkable polyester film of 45 μm thick was produced except that the corona treatment under the nitrogen atmosphere was not performed after the film formation. The physical property values of the resulting film are shown in Table 6.

Comparative Example 6

According to the same manner as that described in Example 5, a heat-shrinkable polyester film of 45 μm thick was obtained except that the corona treatment after the film formation was performed under a nitrogen atmosphere at a treatment atmosphere temperature of 55° C. and at a treatment roll surface temperature of 55° C., and the conversion value of surface treatment energy of 0.01 kW/m²/min. The physical property values of the resulting film are shown in Table 6.

The compositions of raw materials and the physical property values of the films are shown in Tables 5 and 6, respectively.

at 280° C. with a single screw extruder, and then quenched to obtain an unoriented film of 180 μm thick. At this time, sodium straight-chain alkyl-sulfonate (Atoray AS-1000 manufactured by Nippon Kogyo Co., Ltd.) was added in an amount shown in Table 8 as an antistatic agent.

The above unoriented film was pre-heated at 100° C. for 10 seconds and then oriented 4.0 times in the crosswise direction at 80° C. with a tenter and subsequently heated at 80° C. for 10 seconds to obtain a heat-shrinkable polyester of 45 μm thick. The film was then introduced into a corona treatment apparatus whose treatment electrode and treatment section were doubly enclosed and continuously supplied with nitrogen to form a nitrogen atmosphere. The film was subjected to corona treatment under the nitrogen atmo-

TABLE 5

| | Composition of Polyester (mol %) | | | | Composition of Film (mass %) | | | | |
|---|---|---|---|---|---|---|---|---|---|
| | Dicarboxylic Acid Component | Diol Component | | | | | | Comp. | Comp. |
| | DMT | EG | NPG | BD | Ex. 5 | Ex. 6 | Ex. 7 | Ex. 5 | Ex 6 |
| Chip A | 100 | 70 | 30 | — | 53 | 53 | 53 | 53 | 53 |
| Chip B | 100 | 100 | — | — | 37 | 37 | 37 | 37 | 37 |
| Chip C | 100 | — | — | 100 | 10 | 10 | 10 | 10 | 10 |

TABLE 6

| | | Ex. 5 | Ex. 6 | Ex. 7 | Comp. Ex. 5 | Comp. Ex. 6 |
|---|---|---|---|---|---|---|
| Lubricant | Type | Silica Aggregate | Spherical Silica | Spherical Silica | Silica | Spherical Silica |
| | Average Particle Diameter (μm) | 1.8 | 1.65 | 5.8 | 0.007 | 1.65 |
| | Addition Amount (% by mass) | 0.063 | 0.07 | 0.08 | 1.00 | 0.07 |
| Treatment Conditions | Atmosphere | Nitrogen | Nitrogen | Nitrogen | — | Nitrogen |
| | Oxygen Concentration of the Atmosphere (ppm) | 270 | 150 | 2500 | — | 20500 |
| | Conversion Value of Surface Treatment Energy (kW/m²/min) | 0.30 | 0.50 | 0.15 | — | 0.01 |
| | Film Surface Temperature (° C.) | 40 | 40 | 55 | — | 57 |
| | Cover for Gap between Enclosing Device and Film | Present | Present | Absent | — | Absent |
| Physical Properties | Heat Shrinkage(%) | 47.0 | 46.5 | 47.0 | 46.5 | 46.5 |
| | Nitrogen Atom Content of Film Surface(%) | 0.7 | 1.1 | 0.2 | 0 | 0 |
| | Lowering Rate of Nitrogen Atom Content after Immersion in Aqueous 1.5% NaOH Solution at 85° C.(%) | 60 | 77 | 33 | — | — |
| | Wet Tension (mN/m) | 54.0 | 58.0 | 44.0 | 35.0 | 48.0 |
| | Heat Seal Strength (N/15 mm) | | | | | |
| | 75° C. | 4.7 | 0.2 | 5.0 | 0.7 | 6.8 |
| | 85° C. | 7.2 | 1.7 | 7.5 | 6.3 | 8.9 |
| | Ink Adhesion | ○ | ○ | Δ | Δ | ○ |
| | Alkali Removable Properties | ○ | ○ | Δ | Δ | ○ |
| | Label Opening Properties | ○ | ○ | ○ | ○ | x |
| | SΔa (μm) | 0.015 | 0.025 | 0.035 | 0.006 | 0.025 |
| | The Number of 1.89 μm or higher Peaks | 0 | 0 | 7 | 0 | 0 |
| | Travelling Properties | 4 | 5 | 5 | 2 | 5 |
| | Abrasion Resistance | 5 | 4 | 1 | 5 | 4 |

Example 8

Each of chips obtained in the above Synthesis Examples was separately pre-dried. As shown in Table 7, while 52% by weight of Chip A, 38% by weight of Chip B and 10% by weight of Chip C were separately and continuously supplied with a metering screw feeder to a hopper provided right over an extruder, they are mixed in the hopper, and melt-extruded sphere under the conditions as shown in Table 8. At this time, a high-frequency power supply unit manufactured by Kasuga Electric Works Ltd. was used; an oscillation frequency was 45 kHz±3 kHz; the treatment electrode was a bar type made of aluminum; a gap between the treatment electrode and the film was 0.5 mm; the treatment roll having a silicone rubber surface was used; both treatment atmosphere temperature and treatment roll surface temperature were 40° C.; and the film surface temperature upon treatment was also 40° C. A gap between the film and the enclosing device was 0.3 mm and the gap was covered with cotton cloth (velveteen). When the film was produced, the concentration of oxygen in the nitrogen atmosphere was 250 ppm. The physical property values of the resulting film are shown in Table 8.

Example 9

According to the same manner as that described in Example 8, an unoriented film was obtained. At this time, a lubricant and an antistatic agent were each in an amount shown in Table 8. The unoriented film was pre-heated at 100° C. for 10 seconds and then oriented 4.0 times in the crosswise direction at 80° C. with a tenter and subsequently heated at 80° C. for 10 seconds to obtain a heat-shrinkable polyester film of 45 μm thick. The film was then introduced into a corona treatment system whose treater electrodes and treater section were enclosed and continuously supplied with nitrogen to form a nitrogen atmosphere. The film was subjected to corona treatment under the nitrogen atmosphere under the conditions as shown in Table 8. The same treatment facilities as those of Example 8 were used to obtain a heat-shrinkable polyester film. The physical property values of the resulting film are shown in Table 8.

Example 10

According to the same manner as that described in Example 8, an unoriented film was obtained. At this time, a lubricant was added in an amount shown in Table 8. The unoriented film was pre-heated at 100° C. for 10 seconds and then oriented 4.0 times in the crosswise direction at 80° C. with a tenter and subsequently heated at 80° C. for 10 seconds to obtain a heat-shrinkable polyester film of 45 μm thick. The film was then introduced into a corona treatment apparatus whose treatment electrode and treatment section were enclosed and continuously supplied with nitrogen to form a nitrogen atmosphere. The film was subjected to corona treatment under the nitrogen atmosphere under the conditions as shown in Table 2. The same treatment apparatus as that in Example 8 was used to obtain a heat-shrinkable polyester film. The surface opposite to the thus-treated surface was coated with an antistatic agent. The type and the amount of coating of the antistatic agent are shown in Table 8. The physical property values of the film are shown in Table 8.

Example 11

According to the same manner as that described in Example 8, a heat-shrinkable polyester film of 45 μm thick was obtained except that no antistatic agent was added. The physical property values of the resulting film are shown in Table 8.

Comparative Example 7

According to the same manner as that described in Example 8, a heat-shrinkable polyester film of 45 μm thick was obtained except that the corona treatment was not performed after the film formation. The physical property values of the resulting film are shown in Table 8.

Comparative Example 8

According to the same manner as that described in Example 8, an unoriented film was obtained. At this time, a lubricant was added in an amount shown in Table 8, but no antistatic agent was added. The unoriented film was pre-heated at 100° C. for 10 seconds and then oriented 4.0 times in the crosswise direction at 80° C. with a tenter and subsequently heated at 80° C. for 10 seconds to obtain a heat-shrinkable polyester film of 45 μm thick. The film was then introduced into a corona treatment apparatus under air atmosphere and subjected to corona treatment under the conditions as shown in Table 2. The same treatment facilities as those of Example 8 were used to obtain a heat-shrinkable film. The physical property values of the resulting film are shown in Table 8.

The compositions of raw materials and the physical property values of the film are shown in Tables 7 and 8.

TABLE 7

| | Composition of Polyester (mol %) | | | | Composition of Film (mass %) | | | | | |
|---|---|---|---|---|---|---|---|---|---|---|
| | Dicarboxylic Acid Component | Diol Component | | | | | | | Comp. | Comp. |
| | DMT | EG | NPG | BD | Ex. 8 | Ex. 9 | Ex. 10 | Ex. 11 | Ex. 7 | Ex. 8 |
| Chip A | 100 | 70 | 30 | — | 52 | 52 | 52 | 52 | 52 | 52 |
| Chip B | 100 | 100 | — | — | 38 | 38 | 38 | 38 | 38 | 38 |
| Chip C | 100 | — | — | 100 | 10 | 10 | 10 | 10 | 10 | 10 |

TABLE 8

| | | Ex. 8 | Ex. 9 | Ex. 10 | Ex. 11 | Comp. Ex. 7 | Comp. Ex. 8 |
|---|---|---|---|---|---|---|---|
| Lubricant | Type | Silica Aggregate | Spherical Silica | Silica Aggregate | Silica Aggregate | Silica | Spherical Silica |
| | Average Particle Diameter (μm) | 1.8 | 1.65 | 5.8 | 1.8 | 0.007 | 1.65 |
| | Addition Amount (mass %) | 0.063 | 0.07 | 0.063 | 0.063 | 1.00 | 0.07 |
| Antistatic Agent | Type | AS-1000 | AS-1000 | Sodium Paraffin Sulfonate | Absent | AS-1000 | Absent |

TABLE 8-continued

|  |  | Ex. 8 | Ex. 9 | Ex. 10 | Ex. 11 | Comp. Ex. 7 | Comp. Ex. 8 |
|---|---|---|---|---|---|---|---|
|  | Adding Method | Kneading | Kneading | Coating after Film Formation | Kneading | | |
|  | Addition Amount | 0.475% | 0.475% | 0.005 g/m$^2$ | | 0.475% | |
| Treatment Conditions | Atmosphere | Nitrogen | Nitrogen | Nitrogen | Nitrogen | — | Air |
|  | Oxygen Concentration of Atmosphere (ppm) | 250 | 150 | 250 | 250 | — | 20500 |
|  | Conversion Value of Surface Treatment Energy (kW/m$^2$/min) | 0.30 | 0.50 | 0.30 | 0.30 | — | 0.01 |
|  | Film Surface Temperature (° C.) | 40 | 40 | 40 | 40 | — | 57 |
|  | Cover for Gap between Enclosing Device and Film | Present | Present | Present | Present | — | Absent |
| Physical Properties | Heat Shrinkage(%) | 47.1 | 46.4 | 47.1 | 47.0 | 46.5 | 46.5 |
|  | Nitrogen Atom Content of Film Surface(%) | 0.7 | 1.1 | 0.7 | 0.7 | 0 | 0 |
|  | Wet Tension (mN/m) | 54.0 | 58.0 | 54.2 | 54.1 | 35.0 | 48.0 |
|  | Wet Tension (N/15 mm) | | | | | | |
|  | 75° C. | 4.7 | 0.2 | 4.5 | 4.7 | 0.7 | 6.8 |
|  | 85° C. | 7.2 | 1.7 | 7.1 | 7.2 | 6.3 | 8.9 |
|  | Ink Adhesion | ○ | ○ | ○ | ○ | Δ | ○ |
|  | Alkali Removable Properties | ○ | ○ | ○ | ○ | Δ | ○ |
|  | Label Opening Properties | 6 | 6 | 6 | 5 | 6 | 1 |
|  | SΔa (μm) | 0.015 | 0.025 | 0.015 | 0.015 | 0.006 | 0.025 |
|  | The Number of 1.89 μm or higher Peaks | 0 | 0 | 0 | 0 | 0 | 0 |
|  | Travelling Properties | 4 | 5 | 4 | 4 | 2 | 5 |
|  | Abrasion Resistance | 5 | 4 | 5 | 5 | 5 | 4 |
|  | Specific Surface Resistance (Ω·cm) | $7.5 \times 10^9$ | $7.7 \times 10^9$ | $1.2 \times 10^{10}$ | $10^{15}$ or More | 5 | $10^{15}$ or More |

INDUSTRIAL APPLICABILITY

The heat-shrinkable film of the present invention has good adhesion for various types of ink, good removable properties for alkali-removable type ink, and good opening properties after cutting the film it into label pieces, and therefore is very useful for industrial production.

The invention claimed is:

1. A heat-shrinkable resin film for a label characterized in that:
   the film consists of a monolayer polyester resin film or a polystyrene resin film,
   the film has a heat shrinkage in the maximum shrinkage direction of 40% or higher, when a 10 cm×10 cm square sample cut out thereof is immersed in water at 85° C. for 10 seconds, pulled out, subsequently immersed in water at 25° C. for 10 seconds, and then pulled out;
   the film has a content of nitrogen atoms in a surface of the film of 0.1% to 3.0%;
   a wet tension of the surface of the film is 36 mN/m or higher and,
   both surfaces of the film exhibit a peeling strength of 5N/15 mm wide or lower after the surfaces of the film are bonded to each other by heat sealing at 75° C.

2. The heat-shrinkable resin film according to claim 1 which is a heat-shrinkable polyester film characterized in that, after the film is immersed in an aqueous 1.5% NaOH solution at 85° C. for 15 minutes, a lowering rate of a content of nitrogen atoms is 50% or more.

3. The heat-shrinkable resin film according to claim 1 wherein the heat-shrinkable resin film has a wet tension of a surface containing nitrogen atoms is 45 mN/m or lower; an average three-dimensional gradient of a three-dimensional surface roughness SΔa of at least one surface of the film is in the range of 0.01 to 0.04; and the surface has substantially no projection having a height of at least 1.89 μm.

4. The heat-shrinkable resin film according to claim 1 wherein at least one surface of the film has specific surface resistance of 1×10$^{13}$ (Ω·cm) or less.

5. A label comprising a heat-shrinkable film as defined in claim 1.

6. A heat-shrinkable resin film roll for a label characterized in that:
   the roll is obtained by winding up a heat-shrinkable resin film consisting of a monolayer polyester resin film or a monolayer polystyrene resin film and having heat shrinkage in the maximum shrinkage direction of 40% or higher, when a 10 cm×10 cm square sample cut out thereof is immersed in hot water at 85° C. for 10 seconds, pulled out, subsequently immersed in water at 25° C. for 10 seconds, and then pulled out, wherein at least one surface has a content of nitrogen atoms of 0.1% to 3.0% and wet tension of 36 mN/m or higher,
   when the rolled film is sampled at a first sampling part located up to 2 m from an end of the rolled film, and at other sampling parts located after the first sampling part at intervals of about 100 m, and an average content of nitrogen atoms of each sample is calculated, the content of nitrogen atoms of each sample is within a ±0.8% range based on the above average content of nitrogen atoms, and both surfaces of the film have a peeling strength of 5N/15 mm wide or lower after the surfaces of the film are bonded to each other by heat sealing at 75° C.

7. A process for producing a heat-shrinkable resin film roll for a label, comprising treating at least one surface of the heat-shrinkable film according to claim 6 with a corona or plasma discharge under a nitrogen atmosphere, followed by winding up the heat-shrinkable film.

8. The process for producing the heat-shrinkable resin film roll according to claim 7, wherein the nitrogen atmosphere in the corona or plasma treatment has oxygen concentration of 1500 ppm or lower, and variability in the oxygen concentration is within ±200 ppm from the average oxygen concentration over the entire length of the film.

9. The heat-shrinkable resin film roll according to claim 6, wherein the film has at least 200 mm wide and at least 300 m long.

10. A label obtained from a heat-shrinkable film roll as defined in claim 2.

* * * * *